(12) United States Patent
Gill et al.

(10) Patent No.: US 11,498,287 B2
(45) Date of Patent: Nov. 15, 2022

(54) METHOD OF DESIGNING AND PRODUCING CARBON FIBER COMPOSITE WRIST PINS

(71) Applicant: AWA Forged Composites, LLC, Rolling Hill Estates, CA (US)

(72) Inventors: Bryan Gill, Rancho Palos Verdes, CA (US); Brennan C. Lieu, Torrance, CA (US)

(73) Assignee: AWA Forged Composites, LLC, Rolling Hill Estates (CA)

( * ) Notice: Subject to any disclaimer, the term of this patent is extended or adjusted under 35 U.S.C. 154(b) by 5 days.

(21) Appl. No.: 17/371,959

(22) Filed: Jul. 9, 2021

(65) Prior Publication Data
US 2022/0009175 A1 Jan. 13, 2022

Related U.S. Application Data

(60) Provisional application No. 63/050,223, filed on Jul. 10, 2020.

(51) Int. Cl.
*B29C 70/34* (2006.01)
*B29C 33/38* (2006.01)
*B29C 70/54* (2006.01)
*B29L 31/06* (2006.01)

(52) U.S. Cl.
CPC ........ *B29C 70/345* (2013.01); *B29C 33/3842* (2013.01); *B29C 70/545* (2013.01); *B29L 2031/06* (2013.01)

(58) Field of Classification Search
None
See application file for complete search history.

(56) References Cited

U.S. PATENT DOCUMENTS

| 4,430,906 A | 2/1984 | Holtzberg | |
|---|---|---|---|
| 2019/0022805 A1* | 1/2019 | Gill | F02F 3/0023 |

FOREIGN PATENT DOCUMENTS

JP 2-16854 U * 2/1990

* cited by examiner

*Primary Examiner* — Jeffry H Aftergut
(74) *Attorney, Agent, or Firm* — Sonia K. Guterman; Preeti T. Arun; Armis Intellectual Property Law, LLC

(57) ABSTRACT

A method is provided of designing and producing a carbon fiber composite wrist pin using a combination of a carbon fiber composite pultruded rod that is overwrapped with a carbon fiber prepreg fabric. The use of the carbon fiber pultruded rod and the carbon fiber prepreg fabric results in a rod with optimal flexural strength properties to endure the flexural stress placed on a wrist pin during the cycling of an internal combustion engine. In addition, the overwrapping of the pultruded rod with a carbon fiber prepreg fabric allows for one pultruded rod blank to produce multiple wrist pin sizes by allowing one to change the outer diameter of the wrist pin by changing the thickness of the carbon fiber prepreg fabric overwrapping. After overwrapping, the rod blank is cut to a chosen specific length, optionally inserted into a metal sleeve, and coated with a thermal barrier coating. The wrist pin is then ground to a chosen specific tolerance and coated with an anti-friction coating.

10 Claims, 8 Drawing Sheets

METHOD OF DESIGNING AND PRODUCING CARBON FIBER COMPOSITE WRIST PINS

RELATED APPLICATION

This claims the benefit of U.S. provisional application Ser. No. 63/050,223 filed Jul. 10, 2020, titled, "Method of Designing and Producing Carbon Fiber Composite Wrist Pins" by inventors Bryan Gill and Brennan C. Lieu, which is hereby incorporated by reference herein in its entirety.

FIELD OF INVENTION

The present application relates to wrist pin manufacturing and methods of designing and producing carbon fiber composite wrist pins for industrial, marine, small aircraft, diesel, and other internal combustion transportation type applications. More specifically, the present invention pertains to a new method of designing and producing a carbon fiber composite wrist pin using a carbon fiber composite pultruded rod that is overwrapped with a carbon fiber prepreg fabric, inserted into a metal sleeve and coated with a thermal barrier coating and an anti-friction coating. The present invention also provides a design process that allows many different designs to be produced from a single pultruded rod blank.

BACKGROUND

Automotive wrist pins are well-known structures that join connecting rods to pistons. Some wrist pins are press-fit into the small end of the connecting rod while others are placed in the rods with a "free-floating" loose fit. High-performance wrist pins are lightweight and high strength structures which are specifically designed to tolerate the increased power and loads present within engines during competition or rigorous use. Wrist pins are replaced for increased performance and better fuel economy because a lightweight and high strength wrist pin results in a lower amount of energy required to accelerate the wrist pin, piston and connecting rod assembly up and down. As a result, a reduced amount of energy is required for an engine to accelerate. Further, even at a constant speed during transient response cycling, engines spend energy to move the wrist pin, connecting rod, and piston rod assembly up and down. Therefore, decreasing the weight of wrist pins reduces the energy spent by the engine in the transient response cycling, leading to greater power and better fuel economy in a rotating assembly of an engine.

Increasing power of an engine leads to increased stresses which are placed on the various parts of the engine, including increased stresses placed on the wrist pins. Advancements in engine technology have resulted in a demand for wrist pins that are both lighter and stronger than previous generations of wrist pins.

Demand for improved wrist pins is more important in the field of auto racing, including for gas, alcohol, diesel, and nitromethane drag race engines which are used in various forms of motor racing. These engines are subjected to heavy loads from the ultra-high combustion pressures. The extreme pressures of combustion put an immense amount of downward force on the pistons of the engines. The pistons transfer the force through the wrist pins, to the connecting rods, and ultimately to the rotating crankshaft assembly. As a result, the downward force creates an immense amount of flexural load on the wrist pins between their contact with the pistons and connecting rods. If the yield strength of the wrist pins is exceeded, the wrist pins, along with most of the other components in the assembly are damaged and destroyed. Typical damage that results from these stresses generally includes bending and distortion of wrist pins into an "egg shape" or, even snapping or shearing of the wrist pin.

The materials used to make high-performance wrist pins are almost exclusively high-tech steel alloys, which are generally characterized as being relatively heavy and having the requisite extremely high degree of material strength required. Steel alloys are used for high-performance engines, such as those used in nitromethane (nitro) fueled drag racing, with the use of the Vascomax C-300 steel alloy. This alloy has sufficient strength to last the extreme flexural loads present in nitro engines that are placed on the wrist pins. However, Vascomax C-300 has an extremely high density, at 8 grams per centimeter cubed. In addition, the manufacturing of these high-tech steel alloys requires a very costly process that includes the use of a "double vacuum melting," in which the alloy has to be melted twice in an airtight crucible while applying vacuum. Therefore, the elaborate process makes these steel alloys very expensive.

Therefore, there is a need in the art for improvements to existing wrist pin designs and manufacturing methods, and particularly a need for alternatives to steel alloy wrist pins. The present invention provides design elements and method steps that diverge substantially from the prior art, and consequently fulfilling these needs.

SUMMARY

In view of the foregoing disadvantages inherent in the known types of steel wrist pins present, embodiments of the present invention provide a new design and manufacturing method which is utilized for producing a carbon fiber composite wrist pin that reduces cost and wasted material to produce a lightweight, high-performance wrist pin for competition or transportation use.

Embodiments of the present invention provide new methods of manufacturing and designing high-performance wrist pins, which increase performance thereof with a high degree of increased power and economy and possess sufficient flexural yield strength to withstand the flexural loads of racing or other engine operations.

The wrist pin has a size and shape for a transportation vehicle that, in various embodiments, is selected from: a motorcycle, a sedan, a pickup truck, a sports utility vehicle, a watercraft, a van, a truck, an airplane, a power boat, a dirt bike, or any other type of internal combustion engine in a racing, commercial, or military vehicle.

An aspect of the invention herein provides a method of designing and producing a carbon fiber composite wrist pin having at least one wrist pin design, which includes the following steps: determining the diameter of a carbon fiber composite pultruded rod blank; overwrapping the pultruded rod blank with a carbon fiber prepreg fabric to under the final wrist pin size; cutting the overwrapped rod to a specific length to obtain wrist pin blanks; coating the wrist pin blanks with a bond coat; coating the wrist pin blanks with a thermal barrier coating; grinding the wrist pin blanks to a specific diameter; coating the wrist pin blanks with an anti-friction coating; grinding the wrist pin blank to final tolerance; lapping or vibratory finishing the blank to a desirable surface finish; and subjecting the blank to heavy metal ion implantation treatment to obtain the final carbon fiber composite wrist pin.

An aspect of the invention herein provides a method for designing and producing a carbon fiber composite wrist pin, the method including: choosing at least one or the plurality of wrist pin designs to obtain a wrist pin blank design, producing a carbon fiber composite pultruded rod blank, and overwrapping the rod with a carbon fiber prepreg fabric to obtain an overwrapped pultruded rod; cutting the overwrapped pultruded rod into a wrist pin blank having the wrist pin blank design; coating the wrist pin blank with a thermal barrier coating and anti-friction coating; and machining the wrist pin blank into at least one of the wrist pin designs; and lapping or vibratory finishing the blank to a desirable surface finish; and treating the wrist pin blank to heavy metal ion implantation treatment to obtain the carbon fiber composite wrist pin.

In an embodiment of the method, producing the carbon fiber composite pultruded rod blank further includes selecting a diameter for the carbon fiber composite pultruded rod blank to obtain a selected blank diameter and fabricating the carbon fiber composite pultruded rod blank having the selected blank diameter. In an embodiment of the method, the selected diameter is smaller than an outer diameter of at least one of the wrist pin designs. In an alternative embodiment of the method, the carbon fiber composite pultruded rod blank is a tube with an internal diameter selected to achieve the best balance of weight and needed strength. In an embodiment of the method, the carbon fiber prepreg fabric is a unidirectional-weave carbon fiber prepreg fabric. In an embodiment of the method, the carbon fiber prepreg fabric is a twill-weave carbon fiber prepreg fabric. In an embodiment of the method, the carbon fiber prepreg fabric is a plain-weave carbon fiber prepreg fabric. In an embodiment of the method, the carbon fiber prepreg fabric is a satin-weave carbon fiber prepreg fabric.

An embodiment of the method further includes prior to overwrapping the rod blank, grinding the pultruded carbon fiber rod blank.

In an embodiment of the method, overwrapping the rod blank further includes overwrapping the carbon fiber prepreg fabric to less than final tolerance of at least one of the wrist pin designs. In an embodiment of the method, cutting further includes machining the overwrapped carbon fiber composite pultruded rod blank into the wrist pin blank.

An embodiment of the method further includes, prior to coating the wrist pin blank, performing at least one step selected from: inserting the wrist pin blank into a metal sleeve, covering the wrist pin blank with a resin, grinding the wrist pin blank to final tolerance, and finishing the wrist pin blank by lapped or vibratory buffing to create a desirable surface finish on the outer diameter of the wrist pin.

An embodiment of the method further includes prior to coating, inserting the wrist pin blank into a metal sleeve. In an alternative embodiment, the wrist pin blank is not inserted into a metal sleeve. In an embodiment of the method, coating the wrist pin blank further includes: applying a bond material on the wrist pin blank; layering a thermal barrier on the wrist pin blank; and varnishing the wrist pin blank with an anti-friction layer.

In an embodiment of the method, the bond material is nickel-aluminide. In an embodiment of the method, the thermal barrier is zirconium dioxide, aluminum oxide, titanium-nitride, or aluminum-titanium-nitride. In an embodiment of the method, the anti-friction layer is selected from: diamond-like carbon (DLC) or molybdenum-disulfide.

An embodiment of the method further includes prior to coating the wrist pin blank with the anti-friction layer, grinding the wrist pin blank to tolerance. In an embodiment of the method, the anti-friction layer is ground to final tolerance and lapped or vibratory finished to achieve a desirable surface finish. In an embodiment of the method, overwrapping the rod further includes laying the carbon fiber prepreg fabric around the rod blank for at least 1 layer, at least 2 layers, at least 3 layers, at least 4 layers, at least 5 layers, at least 6 layers, at least 7 layers, at least 8 layers, at least 9 layers, at least 10 layers, at least 15 layers, at least 20 layers, at least 25 layers, or at least 30 layers. In an alternative embodiment of the invention, the carbon fiber rod is not overwrapped with carbon fiber prepreg fabric. In an embodiment of the method, choosing at least one of the wrist pin designs further includes determining diameter and length of the wrist pin designs.

An aspect of the invention herein provides a carbon fiber composite wrist pin blank having at least one or a plurality of wrist pin designs. An embodiment of the wrist pin blank further includes a carbon fiber pultruded rod. An embodiment of the wrist pin blank further includes a carbon fiber prepreg fabric layer around the rod. An embodiment of the wrist pin blank further includes a metal sleeve around the rod. An embodiment of the wrist pin blank further includes a thermal barrier coating. An embodiment of the wrist pin blank further includes an anti-friction coating.

An aspect of the invention herein provides a carbon fiber composite wrist pin with a carbon fiber pultruded rod wrapped with a carbon fiber prepreg fabric, inserted into a metal sleeve and coated with a thermal barrier material and an anti-friction material.

An aspect of the invention herein provides a method of designing and producing a carbon fiber composite wrist pin using a discontinuous and/or continuous compression molded carbon fiber based composite material, the method including: choosing at least one or a plurality of wrist pin designs, overlaying at least one or the plurality of wrist pin designs in design space to obtain a single wrist pin blank design having a wrist pin blank diameter, and designing a rod blank having a rod blank diameter matching the wrist pin blank diameter; producing a reverse mold of the rod blank, compression molding the rod blank, and cutting the rod blank to obtain wrist pin blanks; and coating the wrist pin blanks and machining the wrist pin blanks to at least one of the wrist pin designs to obtain the carbon fiber composite wrist pins.

In an embodiment of the method, choosing at least one or the plurality of wrist pin designs further includes selecting the wrist pin blank diameter. In an embodiment of the method, compression molding the rod blank further includes: heating the composite material; transferring the composite material into the mold; compressing the material in the reverse mold using a press; and removing the material after cooling. In an embodiment of the method, the wrist pin blank diameter is less than an outer diameter of at least one or the plurality of wrist pin designs. In an embodiment of the method, cutting further includes machining the rod blank to obtain the wrist pin blank.

An embodiment of the method further includes prior to coating, inserting the wrist pin blank into a metal sleeve. In an embodiment of the method, coating the wrist pin blank further includes: applying a bond material on the wrist pin blank; layering a thermal barrier on the wrist pin blank; and coating the wrist pin blank with an anti-friction layer. In an embodiment of the method, the bond material is nickel-aluminide. In an embodiment of the method, the thermal barrier is zirconium dioxide, aluminum oxide, titanium-nitride, or aluminum-titanium-nitride. In an embodiment of the method, the anti-friction layer is diamond-like carbon (DLC) or molybdenum-disulfide. An embodiment of the method further includes prior to coating the wrist pin blank with the anti-friction layer, grinding the wrist pin blank to tolerance. An embodiment of the method further includes after coating the wrist pin blank with the anti-friction layer, grinding the wrist pin blank to final tolerance, and lapping or vibratory finishing the blank to achieve a desirable surface finish.

An aspect of the invention herein provides a carbon fiber composite wrist pin blank having at least one or a plurality of wrist pin designs and having a compression molded carbon fiber based composite rod. An embodiment of the wrist pin blank further includes a metal sleeve around the carbon fiber based composite rod. An embodiment of the wrist pin blank further includes a thermal barrier coating. An embodiment of the wrist pin blank further includes an anti-friction coating.

An aspect of the invention herein provides a carbon fiber composite wrist pin with a compression molded carbon fiber based composite rod, inserted into a metal sleeve, and coated with a thermal barrier material and an anti-friction material.

An aspect of the invention herein provides a method of designing and producing a metal composite hybrid wrist pin using a discontinuous and/or continuous carbon-based composite material as an insert, the method including: choosing at least one or a plurality of wrist pin designs, and overlaying at least one or the plurality of wrist pin designs to obtain a single wrist pin blank design; producing a reverse mold of the wrist pin blank design by determining an outer diameter of a metal tube and an inner diameter of the composite material as the insert; compression molding a wrist pin blank using the reverse mold; and machining the wrist pin blank into at least one or the plurality of wrist pin designs to obtain the metal composite hybrid wrist pin.

In an embodiment of the method, choosing at least one or the plurality of wrist pin designs further includes determining diameter and length of the wrist pin designs. In an embodiment of the method compression molding the wrist pin blank further includes: heating the composite material; transferring the composite material into the mold; compressing the material in the reverse mold using a press; and removing the material after cooling. In an embodiment of the method compression molding the wrist pin blank further includes: sealing the composite material by sodium silicate impregnation; and coating the wrist pin blank with molybdenum to obtain an antifriction surface on the wrist pin blank.

Other objectives, features, and advantages of the present invention will become apparent from the following detailed description taken in conjunction with the accompanying drawings.

DETAILED DESCRIPTION

Figure 1:
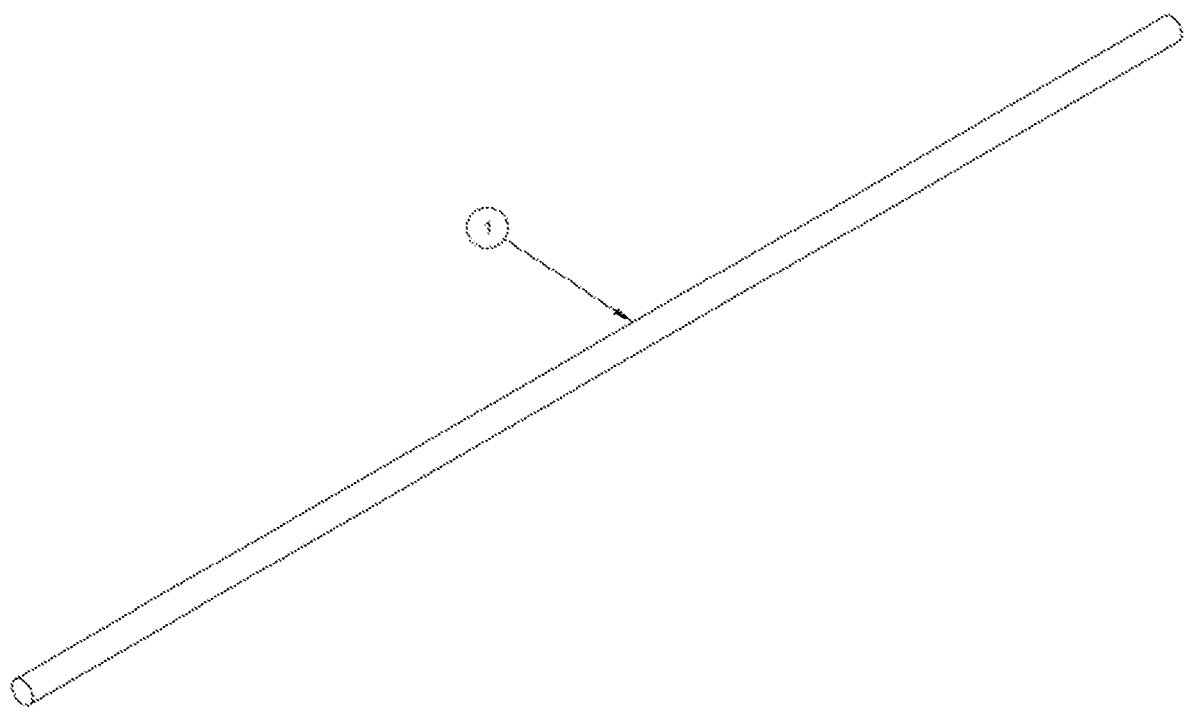
FIG. 1 is an isometric view of a carbon fiber composite pultruded rod blank (1) to be overwrapped with a carbon fiber prepreg fabric.

Reference is made herein to the attached drawings. Like reference numerals are used throughout the drawings to depict like or similar elements of the present methods. For the purposes of presenting a brief and clear description of the present invention, exemplary embodiments are discussed as used for creating a carbon fiber composite wrist pin and a design process that minimizes waste and costs. The figures are intended for representative purposes only and should not be considered to be limiting in any respect.

The present application provides a new method of designing and producing carbon fiber composite wrist pins in which a carbon fiber composite pultruded rod blank is overwrapped with a carbon fiber prepreg fabric. A carbon fiber composite is a composite material that is composed of carbon fiber and resin. The carbon fiber serves as a reinforcement within the resin matrix. The resin is a thermoplastic or thermoset plastic, and bonds with the carbon fiber, creating a material that has an extremely high strength to weight ratio.

Pultrusion is a process used to produce continuous fiber composites with a constant cross section. In this embodiment, the continuous fiber composite being pultruded is a carbon fiber composite shaped as a rod. Pultrusion starts with the carbon fiber reinforcement being pulled into a feed area. In the feed area, the carbon fiber reinforcement is formed into shape and impregnated with the resin. After being pulled into a feed area, the resin-impregnated carbon fiber is pulled through a heated pultrusion die, which is an open hole for creating a rod profile. In the heated pultrusion die, the resin cures and solidifies. The cured carbon fiber composite is then clamped and pulled with puller units. After passing through the puller units, the pultruded profile is then cut to create a pultruded carbon fiber rod.

The use of the carbon fiber composite pultruded rod and the carbon fiber prepreg fabric results in a wrist pin which has an optimal flexural strength and the capability to endure the flexural stress placed on a wrist pin during the cycling of an engine. In addition, the overwrapping of the carbon fiber composite pultruded rod allows flexibility of the outer diameter of the wrist pin. By changing the amount of overwrapping on the wrist pin, the outer diameter of the wrist pin is changed without changing the diameter or size of the carbon fiber composite pultruded rod blank. Further provided is the design of the wrist pin blank that is adaptable to different diameters and lengths with a minimal loss of material during the machining process.

Before making the carbon fiber composite wrist pins, a carbon fiber composite pultruded rod blank design is created from at least one wrist pin design. The carbon fiber composite pultruded rod blank has a diameter that is less than the outer diameter of the wrist pin design that has the smallest diameter such that space remains to overwrap the pultruded rod blank with a carbon fiber prepreg fabric (FIG. 1). One carbon fiber composite pultruded rod blank is used to make at least one wrist pin size, provided each of the wrist pin designs has an outer diameter more than the diameter of the pultruded rod blank. As a result, the design is versatile and economical because there are many different wrist pin sizes and creating pultrusion tooling for each size would be very costly.

Figure 2:
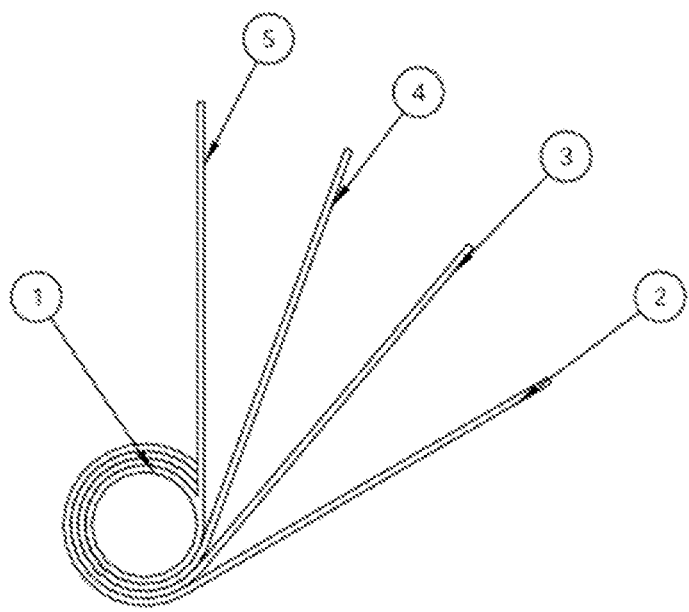
FIG. 2 is a front view of the process of wrapping carbon fiber prepreg fabric around the carbon fiber composite pultruded rod blank (1). The carbon fiber prepreg fabric layers (2, 3, 4, and 5) are being wrapped around the pultruded rod blank (1).
Figure 3:
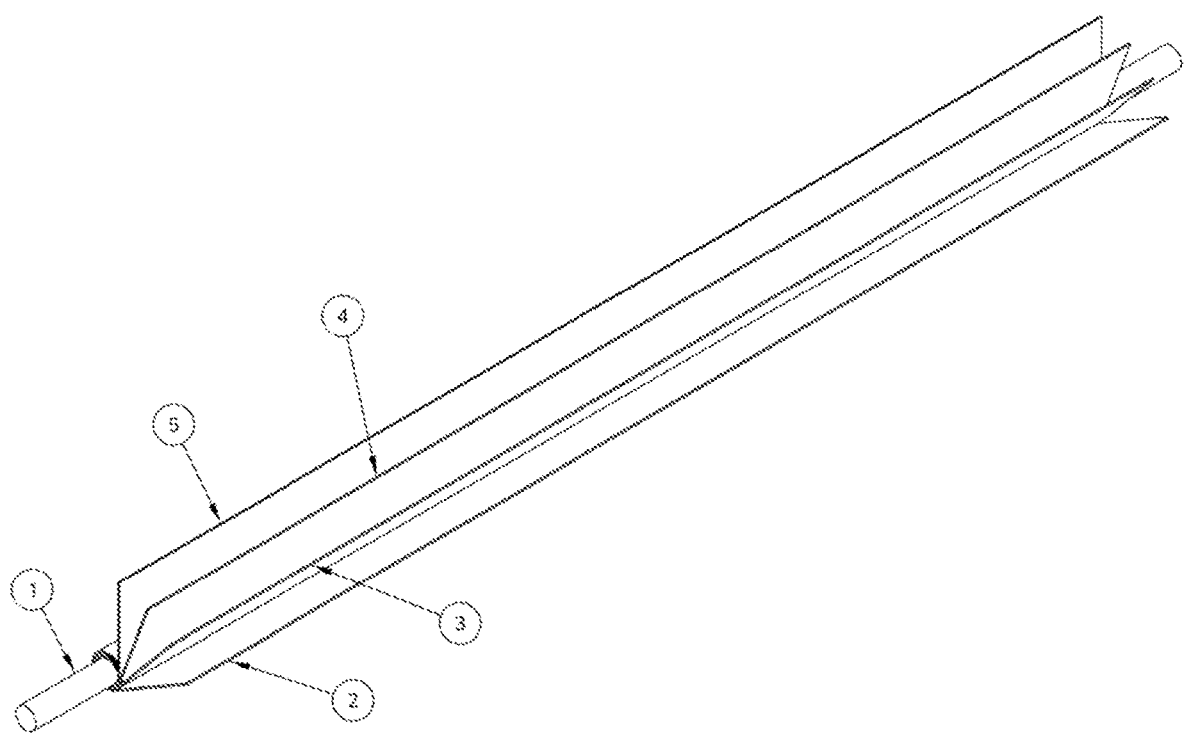
FIG. 3 is an isometric view of the wrapping process of FIG. 2, in which the carbon fiber composite pultruded rod blank (1) is overwrapped by carbon fiber prepreg fabric layers (2, 3, 4, and 5).
Figure 4:
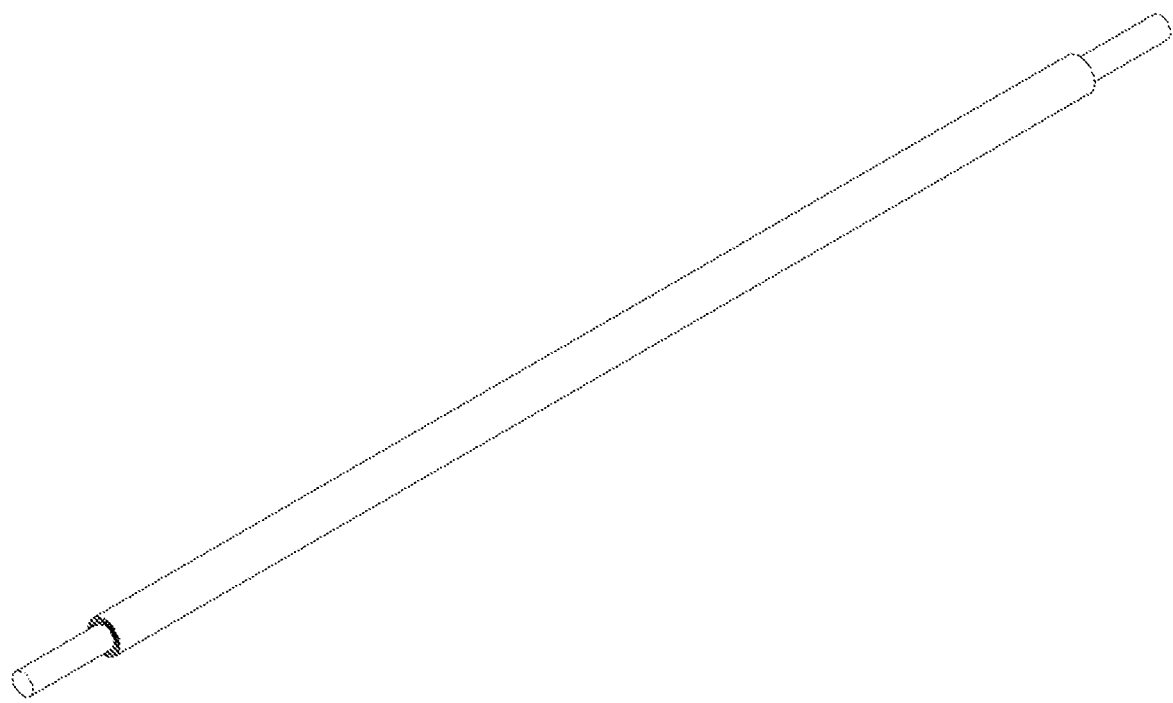
FIG. 4 is an isometric view of the carbon fiber composite pultruded rod blank after being overwrapped with the carbon fiber prepreg fabric layers.
Figure 5:
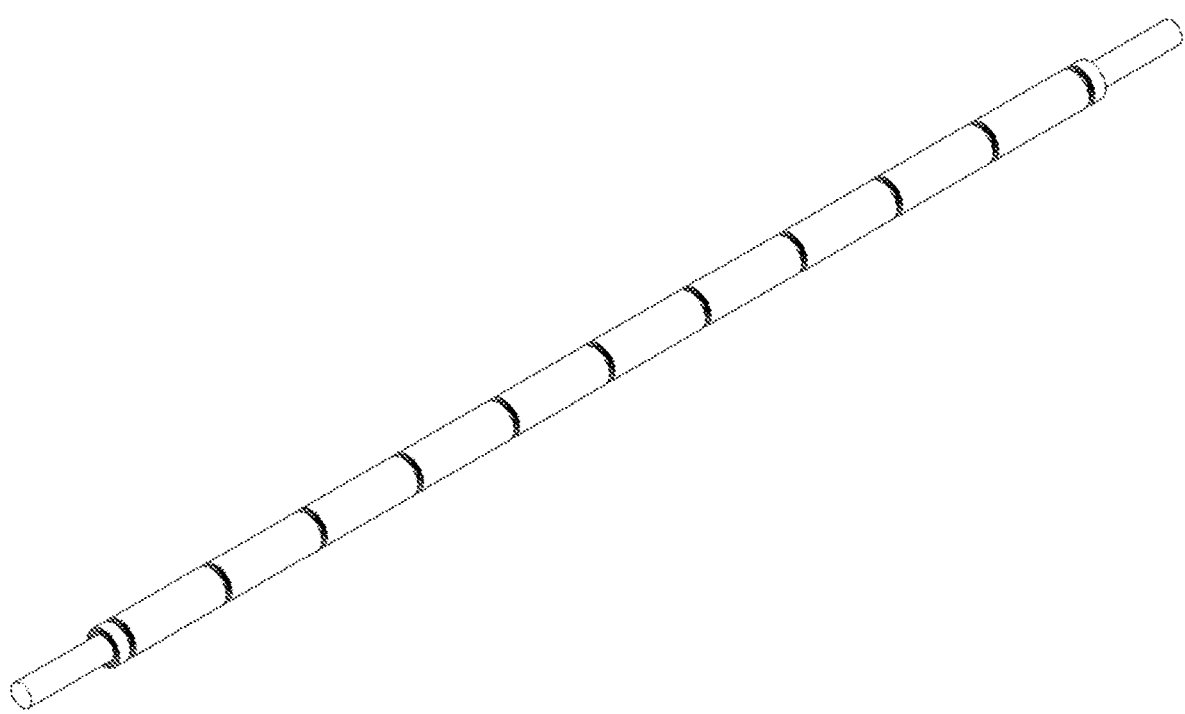
FIG. 5 is an isometric view of the carbon fiber composite pultruded rod blank which is overwrapped with carbon fiber prepreg fabric and cut into multiple sections to obtain wrist pin blanks.
Figure 6:
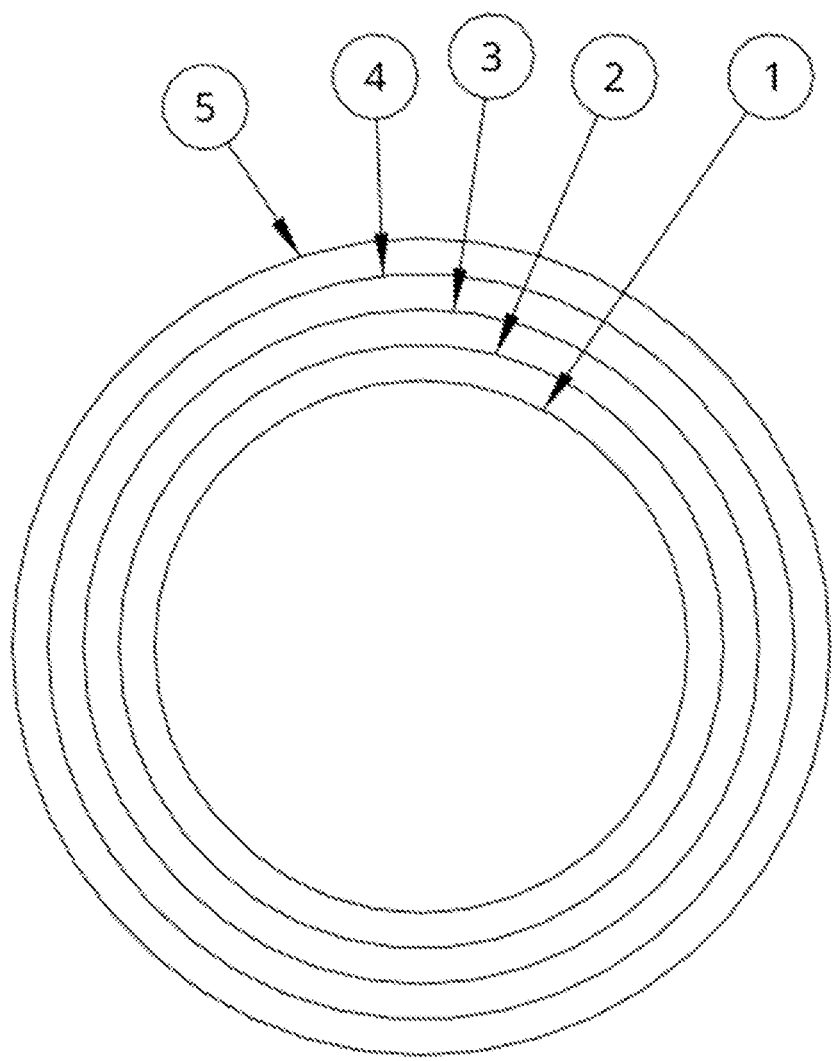
FIG. 6 is a front view of the wrist pin blank which includes the carbon fiber composite pultruded rod (1) overwrapped with carbon fiber prepreg fabric layers (2, 3, 4, and 5).
Figure 7:
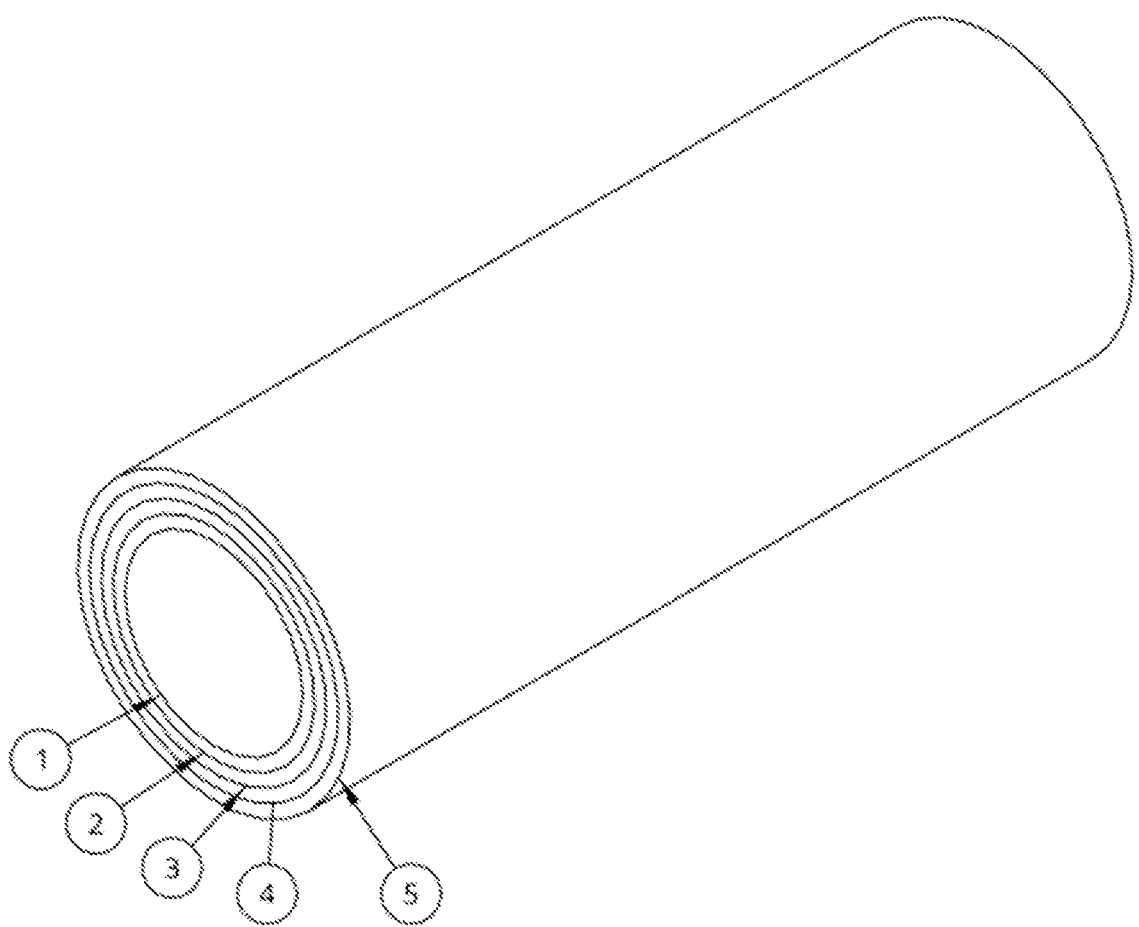
FIG. 7 is an isometric view of a wrist pin blank in which a carbon fiber composite pultruded rod (1) is overwrapped with carbon fiber prepreg fabric layers (2, 3, 4, and 5).

After determining the carbon fiber composite pultruded rod blank design, the carbon fiber composite pultruded rod blank is overwrapped with a carbon fiber prepreg fabric, as shown in FIG. 2, FIG. 3 and FIG. 4. The carbon fiber composite pultruded rod that is overwrapped with carbon fiber prepreg fabric is cut into wrist pin blanks as shown in FIG. 5. The composite wrist pin blanks shown in FIG. 6 and FIG. 7 are a piece of carbon fiber composite pultruded rod that is overwrapped with carbon fiber prepreg fabric layers, which would be one of the cut wrist pin blanks of FIG. 5. A carbon fiber prepreg fabric is a fabric made from pre-impregnated carbon fiber. The carbon fiber is pre-impregnated with a thermoset or thermoplastic resin, and the fabric is in a unidirectional weave, in which every fiber is oriented in the same direction, or the fabric is in other weaves, such as a twill weave, plain weave, or satin weave. Utilizing carbon fiber prepreg fabric allows for optimal evenness and distribution of resin and fiber because the fabric has the optimal fiber to resin balance before being utilized in the manufacturing process, which in this invention is overwrapping around the carbon fiber pultruded rod.

Another method to produce the carbon fiber wrist pin blank is to use compression molding. While in large production, this is not as efficient as pultrusion, in small volumes, compression molding a carbon fiber-based composite can cost less because an expensive pultrusion machine is not required. Instead, a manufacturer uses a press and requires a cheaper compression molding tool instead of an expensive pultrusion machine. To produce the compression molded wrist pin blank, a design for a rod blank with the same diameter of the wrist pin blank is made. A reverse mold is produced to compression mold the rod blank.

To compression mold the rod blank, plies of carbon fiber composite material are heated and transferred into a mold tooling. The material is then compressed using a press and removed after cooling. The rod is then cut into wrist pin blanks in a method which is similar to the method for cutting the overwrapped pultruded rod into wrist pin blanks. After cutting wrist pin blanks, the method for manufacturing the wrist pin blank from the overwrapped pultruded rod and compression molded rod are similar.

Figure 8:
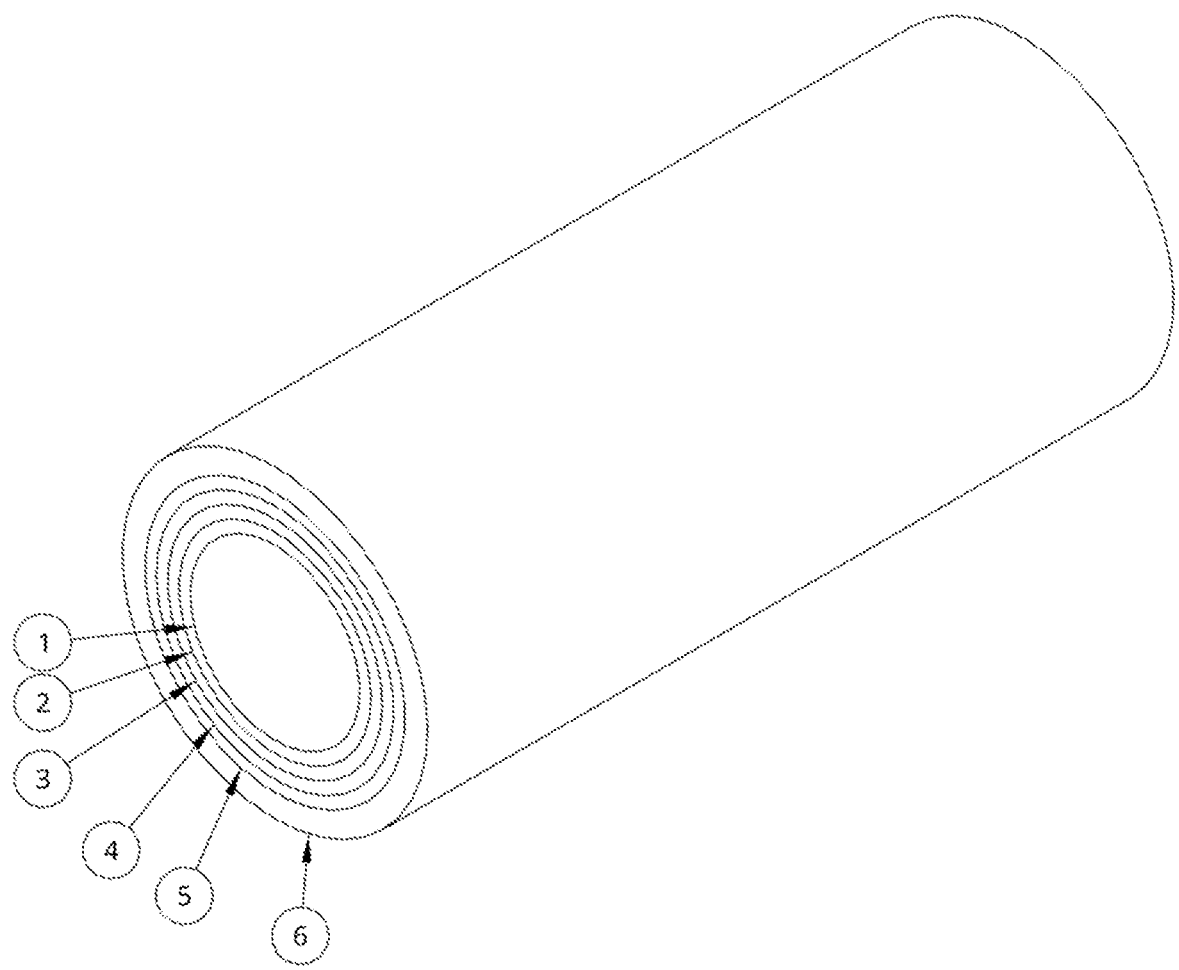
FIG. 8 is an isometric view of a wrist pin blank in which a carbon fiber composite pultruded rod (1) is overwrapped with carbon fiber prepreg fabric layers (2, 3, 4, and 5) and is inserted into a metal sleeve (6).

After cutting the composite wrist pin blank, in some embodiments the blank is inserted into a metal insert, as shown in FIG. 8. Since metals are easier materials for coatings to bond or attach due to their high electrical conductivity, the metal sleeve provides a layer that makes it easier to coat the wrist pin blanks. The metal used are typically steel, titanium, or aluminum. Titanium is optimal because of the high strength to weight ratio, while steel would lead to a much heavier wrist pin and aluminum could be too weak to manage the loads in high performance engines. However, titanium also carries the risk of potentially galling and destroying the engine if the coating is breached, so steel or aluminum, depending on the load application, are used to replace titanium if galling occurs often.

After cutting the composite wrist pin blank, the blank is gel coated with a structural resin. The gel coating is then ground to tolerance, and the gel coated wrist pin blank is lapped or undergoes vibratory finishing to achieve a desirable surface finish. The process of gel coating and lapping or vibratory finishing is used if the thermal-barrier coating and anti-friction coating are applied with a thin layer because thin coatings typically reflect the surface finish of the substrate underneath the coating, and do not provide sufficient material to grind back. It is sometimes impossible to achieve the desired surface finish on the carbon fiber composite, due to the micro-properties of the individual fibers. Therefore, a homogenous gel coat is required for the requisite smooth surface finish.

After being cut, inserted into a metal sleeve, or gel coated, the wrist pin blank is coated with a bond coat, such as nickel-aluminide. The bond coat allows a thermal barrier coating to be able to bond with the wrist pin blank, as it provides a more conductive and harder surface from which the thermal coat can bond to.

Upon applying the bond coat to the wrist pin blank, a thermal barrier coating, such as zirconium dioxide, aluminum oxide, titanium-nitride, or aluminum-titanium-nitride is applied to the wrist pin blank. The wrist pin blank is coated with a thermal barrier coating because the temperature of an engine exceeds the glass transition temperature of some composite substrates, which would lead to the loss of viscosity and potential deformation of the composite during combustion cycles. In addition, heat from friction causes the temperatures that wrist pins endure to exceed standard engine operating temperatures. The loss of viscosity and potential deformation of the wrist pin, in addition to extreme flexural loads a wrist pin undergoes during combustion cycles, can lead to permanent deformation and potentially fracturing of the wrist pin during engine cycles. Therefore, a thermal barrier coating protects the wrist pin at high operating temperatures. Further, if diamond-like carbon (DLC) is used for anti-friction coating, the composite wrist pin blanks have to be placed in a high temperature chamber for a long duration of time for the coating process. Thus, the thermal barrier coating enables the wrist pin to be coated by DLC. Therefore, the thermal barrier coating protects the composite by mitigating the amount of heat transferred to the composite during the anti-friction coating process.

After a thermal barrier coating is applied to the wrist pin blank, the wrist pin blank is typically machined/ground before an anti-friction coat is applied. The grinding ensures that the thickness of the thermal coating is consistent since the thermal barrier coat is allowed to be over-applied and ground down to tolerance.

After grinding the wrist pin blank is coated with an anti-friction coating, such as DLC (diamond-like carbon). An alternative to DLC is molybdenum disulfide. The anti-friction coating is necessary, as it lowers the amount of heat that is generated by friction during engine cycling. Therefore, by lowering the amount of heat, wastage of energy is reduced and efficiency of the engine is increased. Further, the anti-friction coating prevents wear or fatigue of the wrist pins.

After applying the anti-friction coating, the wrist pin blank is ground to final tolerance. In this invention and context, final tolerance refers to the amount of allowed geometric variance tolerable on the outer diameter of the final wrist pin, or the wrist pin after all manufacturing processes are complete. It is a value for the allowed geometrical difference between the actual wrist pin manufactured and its design. Due to the high degree of precision needed for functioning in the high stress applications that wrist pins are subjected to, the final tolerance is very tight on wrist pin diameters. Due to the tolerance being so tight on the outer diameter of wrist pins, this final grinding is required because application of coating is typically uneven. After grinding, lapping or vibratory finishing is used to achieve the desired surface finish on the wrist pin blanks. The final finishing is required because a low surface finish reduces wear and friction on the wrist pins.

After lapping and vibratory finishing, the blank is subjected to heavy metal ion implantation treatment to achieve the final wrist pin. Heavy metal ion implantation is a process that bombards heavy metal ion particles, such as Molybdenum, Titanium, Tungsten, or Chromium, deep into the molecular structure of part surfaces. These ions are typically accelerated to about 400 miles per second before colliding with the wrist pin blank. The process typically occurs in a vacuum of 1 billionth atmospheric pressure to prevent contamination from air molecules or any disruption of the path for the heavy metal ions to flow. Because the bombarding ions add energy to the substrate, and heat cannot dissipate in vacuum, the composite wrist pin blanks typically need a heat soak system to prevent the temperature of the substrate from rising above its glass transition temperature.

Heavy metal ion implantation treatment increases the microhardness of the surface of the wrist pin and fatigue life of the wrist pin. In addition, heavy metal ion implantation treatment creates a surface finish which is smoother compared to typical industrial processes, such as lapping or vibratory finishing.

An alternative embodiment of the present invention provides a method of manufacturing hybrid metal-composite wrist pins using metal and composite material(s), in which the production of the pin involves a forming process and the design method allows for multiple different wrist pin designs to be incorporated into a single manufacturing process. The design method reduces material waste and costs of the wrist pin for the end consumer, while maintaining the benefits offered by composite hybrid metal wrist pins. Metal tubing is machined to an intended outer diameter, then the composite material is inserted into the metal tubing using chopped or discontinuous fiber reinforced plastic to create the wrist pin's insert, such that the chopped fiber is placed into a mold, compression molded into a formed shape, and then machined into a final inner wrist pin diameter. The use of chopped or discontinuous fibers and a forming process allows designers and fabricators to machine the final design from a larger wrist pin blank, which allows one wrist pin blank to be utilized for the strengthening core of multiple wrist pin designs without individually engineering each wrist pin and creating a specific mold for each wrist pin design. The process eliminates the traditional steel forging process, which is labor intensive and design intensive, and requires a specific mandrel or mold for each wrist pin design.

The inventors in devising the methods and devices claimed herein contemplated creating a composite hybrid metal wrist pin of carbon fiber, rather than forging steel. An embodiment of the present invention method utilizes a chopped or discontinuous fiber compression molding process and a design process like metallic wrist pin fabrication but with improved efficiency and with greater RPM optimization. Since chopped or discontinuous fiber is more expensive than metallic materials, a shaped wrist pin blank is created from the combination of several different wrist pin designs, which can then be machined down to the exact wrist pin inner diameter insert design chosen by the end user. The process accommodates the manufacturing of wrist pins of different diameter and design, to produce a final product that connects a connecting rod to a piston.

Once released from the mold, the carbon fiber wrist pin blank is machined into a final design. A CNC milling machine or similar device is utilized to machine the larger wrist pin blank into the final wrist pin design, and then the blank is subjected to impregnation with sodium silicate to arrest fluid uptake by the carbon core.

The sodium silicate impregnation process introduces into the open pores of the substrate composite material a filling substance for eliminating or greatly reducing the undesirable hygroscopic effects of porosity. During the process, the wrist pin blanks are first treated with a solution of sodium silicate containing both potassium dichromate, and chromic acid(s). Sodium silicate solution chemically includes a weight ratio of silica to sodium oxide dissolved in water. The sodium silicate has a weight ratio of 3.22 ($SiO_2$:$Na_2O$), which breaks down as ~28.7% silica ($SiO_2$) to ~8.9% sodium oxide ($Na_2O$), and that translates into a solution that is approximately 37.5% sodium silicate by weight in water. This specific gravity is maintained by addition of water intermittently as the solution tends to evaporate upon heating to operating temperatures.

The solution fills the porosity of the blanks, and the blanks are then thoroughly washed in cold water, thereby leaving the solution in the pores of the substrate composite(s). The blanks are placed in the autoclave to remove the air from the pores in them by applying vacuum for a period of time, usually about 20 minutes at 26"Hg. A heated sodium silicate solution is introduced into the vacuum autoclave and the blanks are covered with the solution and pressure is applied to increase from negative pressure to positive pressure. The standard temperature is around 95 C to 100 C and is accompanied by a pressure of about 60 lbs. to 85 lbs. per square inch. The pressure is maintained for about one 8-hour day, then released. The parts are subsequently removed from the autoclave and solution, then thoroughly washed in cold water. In the final step, the wrist pin blanks are then placed into a low temperature oven at about 100 C for at least one hour.

After sodium silicate impregnation, the outer metal tube and the machined composite core may be heated and cooled, respectively, to achieve small thermal expansion or contraction, respectively, so that the core is inserted without great forces being required.

It is submitted that the instant invention has been shown and described in what are the most practical and preferred method steps. It is recognized, however, that departures may be made within the scope of the invention and that obvious modification will occur to a person skilled in the art. With respect to the above description then, it is to be realized that the optimum dimensional relationships for the parts of the invention, to include variations in size, materials, shape, form, function, steps, and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A method for designing and producing a carbon fiber composite wrist pin, the method comprising:
choosing at least one or a plurality of wrist pin designs to obtain a wrist pin blank design, manufacturing a carbon fiber composite pultruded rod blank, and overwrapping the rod with a carbon fiber prepreg fabric to obtain an overwrapped pultruded rod;
cutting the overwrapped pultruded rod into a wrist pin blank having the wrist pin blank design, coating the wrist pin blank with a thermal barrier coating and anti-friction coating and machining the wrist pin blank into the at least one of the wrist pin designs; and
lapping or vibratory finishing the wrist pin blank to a desirable surface finish, and treating the wrist pin blank to heavy metal ion implantation to obtain the carbon fiber composite wrist pin.

2. The method according to claim 1, prior to manufacturing the carbon fiber composite pultruded rod blank the method further comprises selecting a diameter for the carbon fiber composite pultruded rod blank to obtain a selected blank diameter, the blank diameter being smaller than an outer diameter of at least one of the wrist pin designs; and fabricating the carbon fiber composite pultruded rod blank having the selected blank diameter.

3. The method according to claim 1, the carbon fiber prepreg fabric is selected at least one of: unidirectional-weave, twill-weave, plain weave, or satin weave.

4. The method according to claim 1, overwrapping the rod blank further comprises overwrapping the carbon fiber prepreg fabric to less than final tolerance of at least one of the wrist pin designs.

5. The method according to claim 1 further comprising prior overwrapping, grinding the pultruded carbon fiber rod blank to a chosen extent of tolerance.

6. The method according to claim 1, cutting further comprises machining the overwrapped carbon fiber composite pultruded rod blank into the wrist pin blank.

7. The method according to claim 1 further comprising prior to coating the wrist pin blank, performing at least one step selected from: inserting the wrist pin blank into a metal sleeve, covering the wrist pin blank with a resin, grinding the wrist pin blank to final tolerance, finishing the wrist pin blank by lapped buffing, and finishing the wrist pin blank by vibratory buffing.

8. The method according to claim 1, coating the wrist pin blank further comprises:
applying a bond material on the wrist pin blank, the bond material being nickel-aluminide;
layering a thermal barrier on the wrist pin blank, the thermal barrier being selected from: zirconium dioxide, aluminum oxide, titanium-nitride, and aluminum-titanium-nitride, and optionally grinding the wrist pin blank to tolerance; and
varnishing the wrist pin blank with an anti-friction layer, the anti-friction layer being selected from: diamond-like carbon (DLC) or molybdenum-disulfide, and optionally grinding the wrist pin blank to final tolerance, and optionally finishing the wrist pin blank by lapped or vibratory finish.

9. The method according to claim 1, overwrapping the rod further comprises layering the carbon fiber prepreg fabric around the rod blank for at least 1 layer, at least 2 layers, at least 3 layers, at least 4 layers, at least 5 layers, at least 6 layers, at least 7 layers, at least 8 layers, at least 9 layers, at least 10 layers, at least 15 layers, at least 20 layers, at least 25 layers, or at least 30 layers.

10. The method according to claim 1, prior to choosing the at least one or the plurality of wrist pin designs, the method further comprises determining diameter and length of the wrist pin designs.

* * * * *

UNITED STATES PATENT AND TRADEMARK OFFICE
CERTIFICATE OF CORRECTION

Page 1 of 1

PATENT NO. : 11,498,287 B2
APPLICATION NO. : 17/371959
DATED : November 15, 2022
INVENTOR(S) : Bryan Gill and Brennan C. Lieu It is certified that error appears in the above-identified patent and that said Letters Patent is hereby corrected as shown below:

In the Claims

Column 11 Claim 3, Line 28 replace "selected" with --selected from--
Column 11 Claim 5, Line 35 replace "prior" with --prior to--

Signed and Sealed this
Twenty-seventh Day of August, 2024

Katherine Kelly Vidal
*Director of the United States Patent and Trademark Office*